(12) United States Patent
Tang et al.

(10) Patent No.: US 11,558,852 B2
(45) Date of Patent: Jan. 17, 2023

(54) DATA TRANSMISSION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, South Yarra (AU)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 74 days.

(21) Appl. No.: 16/933,483

(22) Filed: Jul. 20, 2020

(65) Prior Publication Data

US 2020/0351829 A1 Nov. 5, 2020

Related U.S. Application Data

(63) Continuation of application No. PCT/CN2018/073666, filed on Jan. 22, 2018.

(51) Int. Cl.
*H04W 72/02* (2009.01)
*H04W 4/40* (2018.01)
(Continued)

(52) U.S. Cl.
CPC .......... *H04W 72/02* (2013.01); *H04L 5/0051* (2013.01); *H04W 4/40* (2018.02); *H04W 24/10* (2013.01);
(Continued)

(58) Field of Classification Search
CPC ... H04W 72/02; H04W 74/0833; H04W 4/40; H04W 24/10; H04W 72/0406; H04W 72/0446; H04W 72/0453; H04W 92/18; H04W 72/08; H04W 72/085; H04L 5/0051; H04L 5/0048; H04L 5/0053; H04B 7/0695; H04B 7/088
See application file for complete search history.

(56) References Cited

U.S. PATENT DOCUMENTS 8,509,160 B2 * 8/2013 Kotecha ............... H04L 1/0027
370/329
9,407,343 B2 * 8/2016 Krishnamurthy .... H04B 7/0456
(Continued)

FOREIGN PATENT DOCUMENTS

| CN | 104137437 A | 11/2014 |
|---|---|---|
| CN | 104734763 A | 6/2015 |
| CN | 107360625 A | 11/2017 |

OTHER PUBLICATIONS

Extended European Search Report, EP Application 18900862.6 dated Nov. 26, 2020.
(Continued)

*Primary Examiner* — Brian T O Connor
(74) *Attorney, Agent, or Firm* — Young Basile Hanlon & MacFarlane, P.C.

(57) ABSTRACT

Disclosed are a data transmission method and apparatus, and a computer storage medium. The method comprises: a first terminal selects a target channel from N channels based on a first reference signal received on the N channels; the first terminal transmits data or signaling to a second terminal on the target channel.

20 Claims, 4 Drawing Sheets

(51) Int. Cl.
*H04L 5/00* (2006.01)
*H04W 24/10* (2009.01)
*H04W 72/04* (2009.01)
*H04W 92/18* (2009.01)

(52) U.S. Cl.
CPC ... *H04W 72/0406* (2013.01); *H04W 72/0446* (2013.01); *H04W 72/0453* (2013.01); *H04W 92/18* (2013.01)

(56) References Cited

U.S. PATENT DOCUMENTS

| | | | | |
|---|---|---|---|---|
| 10,390,370 | B2* | 8/2019 | Yu | H04W 72/02 |
| 10,743,303 | B2* | 8/2020 | Wang | H04W 56/0045 |
| 10,827,390 | B2* | 11/2020 | Zhao | H04W 28/26 |
| 10,887,736 | B2* | 1/2021 | Lee | H04W 72/02 |
| 11,025,456 | B2* | 6/2021 | Chatterjee | H04L 5/0048 |
| 11,317,415 | B2* | 4/2022 | Khoryaev | G01S 19/46 |
| 11,330,566 | B2* | 5/2022 | Kim | H04B 7/088 |
| 2010/0214953 | A1 | 8/2010 | Barnum | |
| 2016/0073408 | A1* | 3/2016 | Sartori | H04W 72/0453 370/329 |
| 2017/0207828 | A1 | 7/2017 | Jung et al. | |
| 2018/0049219 | A1* | 2/2018 | Gupta | H04W 72/0453 |
| 2019/0104525 | A1* | 4/2019 | Santhanam | H04W 28/0252 |
| 2020/0288471 | A1* | 9/2020 | Yoon | H04W 56/0005 |
| 2021/0127361 | A1* | 4/2021 | Yasukawa | H04W 4/70 |
| 2022/0078761 | A1* | 3/2022 | Kim | H04W 72/1242 |

OTHER PUBLICATIONS

International Search Report issued for PCT/CN2018/073666 dated Aug. 13, 2018.

\* cited by examiner

DATA TRANSMISSION METHOD AND APPARATUS, AND COMPUTER STORAGE MEDIUM

CROSS-REFERENCE TO RELATED APPLICATION(S)

This application is a continuation application of International Application No. PCT/CN2018/073666, filed on Jan. 22, 2018, the entire content of which is hereby incorporated by reference.

TECHNICAL FIELD

The present disclosure relates to the field of wireless communication technologies, in particular to a method for transmitting data, an apparatus for transmitting data, and a computer storage medium.

BACKGROUND

A vehicle networking system adopts a Sidelink (SL) transmission technology based on Long Term Evolution (LTE)—Device to Device (D2D). Different from a mode in which in a traditional LTE system, communication data is received or sent by a base station, a direct terminal-to-terminal communication mode is adopted in the vehicle networking system, thus having a higher spectral efficiency and a lower transmission delay.

In the 3rd Generation Partnership Project (3GPP) Rel-14, Vehicle-to-Everything (V2X) is standardized and two transmission modes are defined: mode 3 and mode 4. In the mode 3, transmission resources of a terminal are allocated by a base station. In the mode 4, the terminal determines transmission resources by means of sensing and reservation.

In New Radio (NR)-V2X, automatic driving needs to be supported, so higher requirements are put forward for data interaction between vehicles, such as a higher throughput, a lower delay, higher reliability, a larger coverage scope, more flexible resource allocation. In order to meet the above requirements, a multi-antenna transmission technology needs to be introduced into the NR-V2X. In the multi-antenna transmission technology, the coverage scope and the reliability may be improved through Beamforming. How to select an optimal beam among multiple candidate beams by a data sending end is implemented through following processes: a sending end needs to perform beam scanning and perform transmission using different beams respectively; a receiving end respectively receives data transmitted through various beams, so that a beam with the best transmission quality may be selected as an optimal beam, and an index value of the beam is fed back to the sending end; and in a subsequent data transmission, the sending end may adopt the optimal beam for performing data transmission.

In the above processes, an optimal beam is selected through a data receiving end and fed back to a data sending end. A feedback channel needs to be designed for this mode. The introduction of the feedback channel will bring following problems.

1) A resource problem of the feedback channel: in the vehicle networking system, especially in the transmission mode of the mode 4, the transmission resources of the terminal are all obtained through a competition mode, so it is difficult to ensure that the data receiving end can obtain resources of the feedback channel.

2) A delay problem of feedback: the data receiving end obtains resources of the feedback channel and feeds back beam information to the data sending end. However, if a feedback delay is very large, the beam information which is fed back may be caused to have been invalid.

3) A transmission problem of feedback information: the data receiving end usually adopts an omnidirectional mode to feedback beam information, and the data sending end also adopts an omnidirectional mode to feedback beam information, it is difficult to guarantee that the data sending end can correctly receive feedback information.

SUMMARY

In order to solve the above technical problems, embodiments of the present disclosure provide a method for transmitting data, an apparatus for transmitting data, and a computer storage medium.

A method for transmitting data provided by an embodiment of the present disclosure includes: receiving, by a first terminal through N channels, a first reference signal sent by a second terminal, where the N is a positive integer, wherein transmission resources among different channels are time division; selecting, by the first terminal based on the first reference signal received on the N channels, a target channel from the N channels; and transmitting, by the first terminal, data or signaling to the second terminal on the target channel.

In an embodiment of the present disclosure, the method further includes: receiving, by the first terminal, a control channel sent by the second terminal, wherein a resource of the control channel of the second terminal and a resource of the first reference signal of the second terminal are time division.

In an embodiment of the present disclosure, the control channel of the second terminal includes first indication information, wherein the first indication information is used for determining that a data channel associated to the control channel of the second terminal includes the first reference signal.

In an embodiment of the present disclosure, a transmission resource of the first reference signal of the second terminal is determined by the control channel of the second terminal.

In an embodiment of the present disclosure, the transmission resource of the first reference signal of the second terminal is determined by the control channel of the second terminal, including: the control channel of the second terminal includes second indication information, wherein the second indication information is used for determining the transmission resource of the first reference signal.

In an embodiment of the present disclosure, the transmission resource of the first reference signal of the second terminal is determined by the control channel of the second terminal, including: the transmission resource of the first reference signal of the second terminal is determined by a transmission resource of the control channel of the second terminal.

In an embodiment of the present disclosure, a control channel of the second terminal includes third indication information, wherein the third indication information is used for determining whether the first reference signal is used for the first terminal to perform selection of a target channel or for the second terminal to perform selection of a target channel.

In an embodiment of the present disclosure, receiving, by the first terminal through the N channels, the first reference signal sent by the second terminal, includes: receiving, by the first terminal through the N channels respectively, N first reference signals sent by the second terminal, wherein the N first reference signals are time division.

In an embodiment of the present disclosure, a control channel of the second terminal includes fourth indication information, wherein the fourth indication information is used for determining a value of the N.

In an embodiment of the present disclosure, a value of the N is configured by a network or pre-configured.

In an embodiment of the present disclosure, the first reference signal is configured by a network or pre-configured.

In an embodiment of the present disclosure, selecting, by the first terminal based on the first reference signal received on the N channels, the target channel from the N channels, includes: measuring, by the first terminal, signal quality of the first reference signal on the N channels, and selecting the target channel from the N channels based on the signal quality corresponding to the N channels.

In an embodiment of the present disclosure, transmitting, by the first terminal, the data or the signaling to the second terminal on the target channel, includes: acquiring, by the first terminal, a target transmission resource by sensing, or receiving, by the first terminal, resource configuration information sent by a network, wherein the resource configuration information includes a target transmission resource used by the first terminal to transmit data; and transmitting, by the first terminal, the data or the signaling to the second terminal using the target channel on the target transmission resource.

A method for transmitting data provided by an embodiment of the present disclosure includes: sending, by a second terminal, a first reference signal to a first terminal, wherein the first reference signal is used for the first terminal to perform reception through N channels, and select a target channel from the N channels based on the first reference signal received on the N channels; wherein the N is a positive integer, and transmission resources among different channels are time division; and receiving, by the second terminal, data or signaling sent by the first terminal on the target channel.

In an embodiment of the present disclosure, the method further includes: sending, by the second terminal, a control channel to the first terminal, wherein a resource of the control channel of the second terminal and a resource of the first reference signal of the second terminal are time division.

In an embodiment of the present disclosure, a control channel of the second terminal includes first indication information, wherein the first indication information is used for determining that a data channel associated to the control channel of the second terminal includes the first reference signal.

In an embodiment of the present disclosure, a transmission resource of the first reference signal of the second terminal is determined by the control channel of the second terminal.

In an embodiment of the present disclosure, the transmission resource of the first reference signal of the second terminal is determined by the control channel of the second terminal, including: the control channel of the second terminal includes second indication information, wherein the second indication information is used for determining the transmission resource of the first reference signal.

In an embodiment of the present disclosure, the transmission resource of the first reference signal of the second terminal is determined by the control channel of the second terminal, including: the transmission resource of the first reference signal of the second terminal is determined by a transmission resource of the control channel of the second terminal.

In an embodiment of the present disclosure, a control channel of the second terminal includes third indication information, wherein the third indication information is used for determining whether the first reference signal is used for the first terminal to perform selection of a target channel or for the second terminal to perform selection of a target channel.

In an embodiment of the present disclosure, sending, by the second terminal, the first reference signal to the first terminal, includes: sending, by the second terminal, N first reference signals to the first terminal, wherein the first terminal respectively receives the N first reference signals through the N channels, wherein the N first reference signals are time division.

In an embodiment of the present disclosure, a control channel of the second terminal includes fourth indication information, wherein the fourth indication information is used for determining a value of the N.

In an embodiment of the present disclosure, a value of the N is configured by a network or pre-configured.

In an embodiment of the present disclosure, the first reference signal is configured by a network or pre-configured.

An apparatus for transmitting data provided by an embodiment of the present disclosure includes: a first receiving unit, configured to receive, through N channels, a first reference signal sent by a second terminal, where the N is a positive integer, wherein transmission resources among different channels are time division; a selecting unit, configured to select a target channel from the N channels based on the first reference signal received on the N channels; and a transmitting unit, configured to transmit data or signaling to the second terminal on the target channel.

In an embodiment of the present disclosure, the apparatus further includes: a second receiving unit, configured to receive a control channel sent by the second terminal, wherein a resource of the control channel of the second terminal and a resource of the first reference signal of the second terminal are time division.

In an embodiment of the present disclosure, a control channel of the second terminal includes first indication information, wherein the first indication information is used for determining that a data channel associated to the control channel of the second terminal includes the first reference signal.

In an embodiment of the present disclosure, a transmission resource of the first reference signal of the second terminal is determined by the control channel of the second terminal.

In an embodiment of the present disclosure, the transmission resource of the first reference signal of the second terminal is determined by the control channel of the second terminal, including: the control channel of the second terminal includes second indication information, wherein the second indication information is used for determining the transmission resource of the first reference signal.

In an embodiment of the present disclosure, the transmission resource of the first reference signal of the second terminal is determined by the control channel of the second terminal, including: the transmission resource of the first reference signal of the second terminal is determined by a transmission resource of the control channel of the second terminal.

In an embodiment of the present disclosure, a control channel of the second terminal includes third indication information, wherein the third indication information is used for determining whether the first reference signal is used for the first terminal to perform selection of a target channel or for the second terminal to perform selection of a target channel.

In an embodiment of the present disclosure, the first receiving unit is configured to receive, through the N channels respectively, N first reference signals sent by the second terminal, wherein the N first reference signals are time division.

In an embodiment of the present disclosure, a control channel of the second terminal includes fourth indication information, wherein the fourth indication information is used for determining a value of the N.

In an embodiment of the present disclosure, a value of the N is configured by a network or pre-configured.

In an embodiment of the present disclosure, the first reference signal is configured by a network or pre-configured.

In an embodiment of the present disclosure, the apparatus further includes: a measuring unit, configured to measure signal quality of the first reference signal on the N channels; wherein the selecting unit is configured to select a target channel from the N channels based on the signal quality corresponding to the N channels.

In an embodiment of the present disclosure, the apparatus further includes: a resource acquiring unit, configured to acquire a target transmission resource by sensing, or receive resource configuration information sent by a network, wherein the resource configuration information includes a target transmission resource used by the first terminal to transmit data; wherein the transmitting unit is configured to transmit data or signaling to the second terminal using the target channel on the target transmission resource.

An apparatus for transmitting data provided by an embodiment of the present disclosure includes: a first sending unit, configured to send a first reference signal to a first terminal, wherein the first reference signal is used for the first terminal to perform reception through N channels, and select a target channel from the N channels based on a first reference signal received on the N channels; wherein the N is a positive integer, and transmission resources among different channels are time division; and a transmitting unit, configured to receive data or signaling sent by the first terminal on the target channel.

In an embodiment of the present disclosure, the apparatus further includes: a second sending unit, configured to send a control channel to the first terminal, wherein a resource of a control channel of the second terminal and a resource of the first reference signal of the second terminal are time division.

In an embodiment of the present disclosure, a control channel of the second terminal includes first indication information, wherein the first indication information is used for determining that a data channel associated to the control channel of the second terminal includes the first reference signal.

In an embodiment of the present disclosure, a transmission resource of the first reference signal of the second terminal is determined by the control channel of the second terminal.

In an embodiment of the present disclosure, the transmission resource of the first reference signal of the second terminal is determined by the control channel of the second terminal, including: the control channel of the second terminal includes second indication information, wherein the second indication information is used for determining the transmission resource of the first reference signal.

In an embodiment of the present disclosure, the transmission resource of the first reference signal of the second terminal is determined by the control channel of the second terminal, including: the transmission resource of the first reference signal of the second terminal is determined by a transmission resource of the control channel of the second terminal.

In an embodiment of the present disclosure, a control channel of the second terminal includes third indication information, wherein the third indication information is used for determining whether the first reference signal is used for the first terminal to perform selection of a target channel or for the second terminal to perform selection of a target channel.

In an embodiment of the present disclosure, the first sending unit is configured to send N first reference signals to the first terminal, wherein the first terminal receives the N first reference signals through the N channels respectively, wherein the N first reference signals are time division.

In an embodiment of the present disclosure, a control channel of the second terminal includes fourth indication information, wherein the fourth indication information is used for determining a value of the N.

In an embodiment of the present disclosure, a value of the N is configured by a network or pre-configured.

In an embodiment of the present disclosure, the first reference signal is configured by a network or pre-configured.

A computer storage medium provided by an embodiment of the present disclosure has computer-executable instructions stored thereon, wherein the computer-executable instructions implement, when executed by a processor, the above method for transmitting data.

In technical solutions of embodiments of the present disclosure, a first terminal receives, through N channels, a first reference signal sent by a second terminal, where the N is a positive integer, wherein transmission resources among different channels are time division; the first terminal selects a target channel from the N channels based on a first reference signal received on the N channels; and the first terminal transmits data or signaling to the second terminal on the target channel. By adopting technical solutions of embodiment of the present disclosure, a second terminal sends a first reference signal, and a first terminal receives the first reference signal by adopting a mode of beam polling, selects an optimal beam based on the first reference signal received on various beams, and uses the optimal beam for subsequent data transmission.

BRIEF DESCRIPTION OF DRAWINGS

The drawings described herein are used for providing further understanding of the present disclosure and form a part of the present application. Illustrative embodiments of the present disclosure and the description thereof are used for explaining the present disclosure and are not intended to unduly limit the present disclosure.

DETAILED DESCRIPTION

To understand features and technical contents of embodiments of the present disclosure in more detail, the implementation of the embodiments of the present disclosure will be described in detail below with reference to the drawings, which are used for reference only and are not intended to limit the embodiments of the present disclosure.

In order to facilitate understanding of technical solutions of the embodiments of the present disclosure, mode 3 and mode 4 in vehicle networking are explained below respectively.

Figure 1:
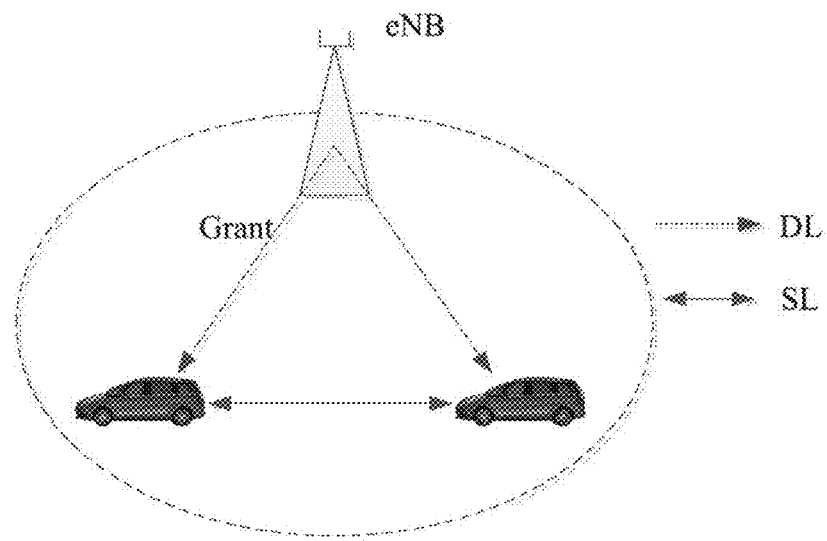
FIG. 1 is a scenario schematic diagram of mode 3 in vehicle networking.

In the mode 3, as shown in FIG. 1, a transmission resource of a Vehicle User Equipment are allocated by a base station (e.g., an evolved NodeB (eNB) in LTE), specifically, the base station sends a control message for indicating Grant resources to the Vehicle User Equipment through a Down Link (DL); then, the Vehicle User Equipment perform sending of data on an SL according to the resource allocated by the base station. In the mode 3, the base station may allocate a resource for a single transmission to the Vehicle User Equipment, or may allocate a resource for a semi-static transmission to the terminal.

Figure 2:
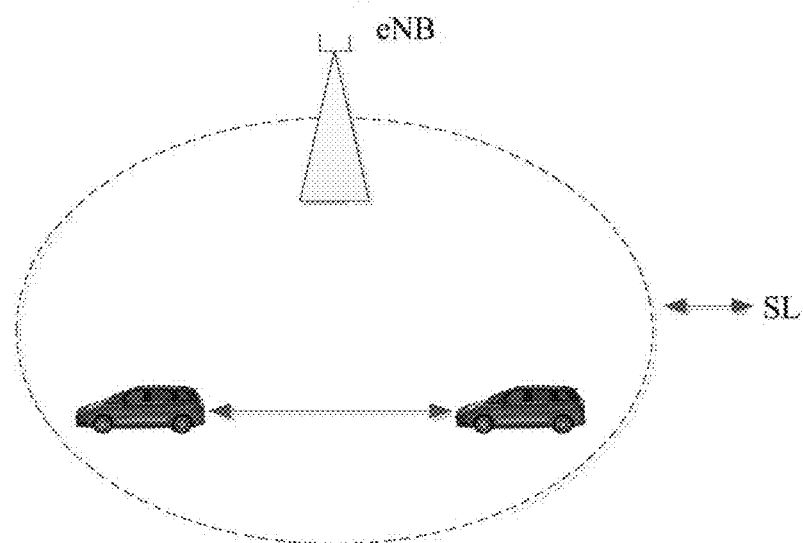
FIG. 2 is a scenario schematic diagram of mode 4 in vehicle networking.

In the mode 4, as shown in FIG. 2, the Vehicle User Equipment adopts a transmission mode of sensing and reservation. The Vehicle User Equipment acquires, in a resource pool, an available set of transmission resources by a mode of sensing, and the Vehicle User Equipment randomly selects one resource from the set of the transmission resources for data transmission. Since services in the vehicle networking system have a periodic characteristic, the Vehicle User Equipment usually adopts a semi-static transmission mode, that is, after selecting one transmission resource, the Vehicle User Equipment will continuously use the resource in multiple transmission periods, thereby reducing probabilities of resource re-selection and resource conflicts. The Vehicle User Equipment will carry, in control information transmitted this time, information for reserving a resource for next transmission, so that another Vehicle User Equipment may determine, by detecting the control information of the Vehicle User Equipment, whether this block of resource is reserved or used by the Vehicle User Equipment, achieving a purpose of reducing resource conflicts.

It should be noted that in LTE-V2X, respectively, the mode 3 is used to represent that a transmission resource of a Vehicle User Equipment is allocated by a base station, and the mode 4 is used to represent that a transmission resource of a Vehicle User Equipment is independently selected by the terminal; and in NR-V2X, a new transmission mode may be defined, which is not limited by the present disclosure.

A multi-antenna transmission technology needs to be introduced into the NR-V2X. Multi-antenna may bring benefits in following aspects.

1) A higher transmission rate: multiple data streams may be transmitted on a same time-frequency resource by using a multiplex transmission mode of multiple antennas, thereby improving a transmission rate.

2) A larger coverage scope and higher reliability: by utilizing a Beamforming technology, energy may be concentrated within a very narrow beam, thereby improving a Signal to Interference plus Noise Ratio (SINR) of a receiving end, thus a probability of successful reception at the receiving end may be improved or a transmission distance may be increased.

An embodiment of the present disclosure provides a method for transmitting data, which can achieve that an optimal beam for sending data is determined in a vehicle networking system. In a technical solution of the embodiment of the present disclosure, a reference signal sending end (i.e., a second terminal) sends a first reference signal (also referred to as a beam training reference signal, or a beam scanning reference signal), and a reference signal receiving end (i.e., a first terminal) respectively receives the first reference signal using different channels (also referred to as beams), and selects an optimal channel (i.e., a target channel) for data transmission.

All technical solutions of embodiments of the present disclosure are not only applicable to a vehicle networking system, but also applicable to other end-to-end communication systems. The terminal in the embodiments of the present disclosure may be a Vehicle User Equipment, a handheld terminal, a Personal Digital Assistant (PDA), a wearable terminal, etc. The network in the embodiments of the present disclosure may be a NR network, an LTE network, etc.

Figure 3:
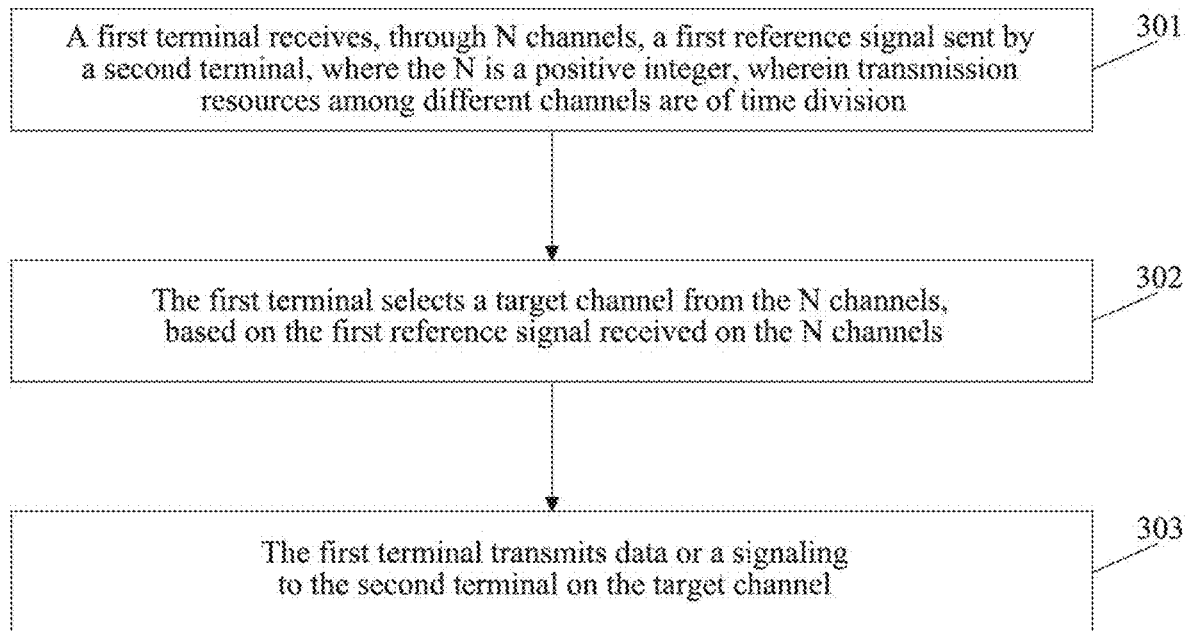
FIG. 3 is Flowchart one of a method for transmitting data according to an embodiment of the present disclosure.

FIG. 3 is Flowchart one of a method for transmitting data according to an embodiment of the present disclosure. As shown in FIG. 3, the method for transmitting data includes following acts.

In act 301, a first terminal receives, through N channels, a first reference signal sent by a second terminal, where the N is a positive integer, wherein transmission resources among different channels are time division.

In the embodiment of the present disclosure, types of the first terminal and the second terminal are not limited and may be devices such as a Vehicle User Equipment, a mobile phone, s notebook computer.

In the embodiment of the present disclosure, the second terminal sends the first reference signal by adopting an omnidirectional manner, and the first terminal receives, through N channels, the first reference signal sent by the second terminal, wherein transmission resources among different channels are time division.

Here, the first terminal receives, through the N channels, the first reference signal sent by the second terminal, which is implemented by a following mode: the first terminal forms N beams by adopting a Beamforming technology, wherein transmission resources among different beams are time division, and one beam represents one channel, and the first terminal adopts a mode of beam polling to receive, through N beams (i.e., channels) respectively, N first reference signals sent by the second terminal, here, the N first reference signals are time division, and the transmission resources may be time-frequency resources.

For example, the second terminal sends N first reference signals, wherein each reference signal occupies one Orthogonal Frequency Division Multiplexing (OFDM) symbol, and the first terminal respectively receives the N first reference signals using the N beams, that is, the first terminal respectively receives the first reference signals using the N beams on the N symbols on which the first reference signals are located.

In an implementation, the first terminal receives a control channel sent by the second terminal, wherein a resource of the control channel of the second terminal and a resource of the first reference signal of the second terminal are time division.

For example, the second terminal sends a Physical Side link Control Channel (PSCCH) on a subframe n, and sends the first reference signal on a subframe n+m, wherein the m is an integer greater than 0. Or, the second terminal sends a PSCCH on symbols p to p+P−1, wherein the P represents a total quantity of symbols occupied by the PSCCH, and starts sending the first reference signal on a symbol p+P−1+q, wherein q is an integer greater than 0. If the second terminal sends N first reference signals, the second terminal sends the first of the first reference signals on a symbol p+P−1+q, and a quantity of symbols between two adjacent first reference signals may be predefined or configured by a network.

In the embodiment of the present disclosure, the control channel of the second terminal may carry one or more kinds of indication information for assisting the first terminal in receiving the first reference signal.

In an implementation, the control channel of the second terminal includes first indication information, wherein the first indication information is used for determining that a data channel associated to the control channel of the second terminal includes the first reference signal.

For example, the first indication information is represented by 1 bit, wherein when the bit is 1, it is represented that a data channel associated to the control channel of the second terminal includes the first reference signal, and when the bit is 0, it is represented that the data channel associated to the control channel of the second terminal does not include the first reference signal.

In an implementation, the transmission resource of the first reference signal of the second terminal is determined by the control channel of the second terminal, specifically as follows.

1) Explicit indication mode: the control channel of the second terminal includes second indication information, wherein the second indication information is used for determining the transmission resource of the first reference signal.

For example, control information of the second terminal includes indication information, wherein the indication information is used for indicating a time-frequency resource of the first reference signal. If the second terminal sends N first reference signals, the indication information indicates the time-frequency resource of the first reference signal, and a quantity of symbols between two adjacent first reference signals may be predefined or configured by a network.

2) Implicit indication mode: the transmission resource of the first reference signal of the second terminal is determined by a transmission resource of the control channel of the second terminal.

For example, a time resource of the first reference signal and a time resource of the control channel differ by S symbols, wherein the S is a positive integer, and the S is predefined or configured by a network.

In the above solution, the transmission resource includes a time domain resource, and/or a frequency domain resource, for example, the transmission resource of the first reference signal includes a time domain resource location on which the first reference signal is located, a time domain resource length, a frequency domain resource location, a frequency domain resource length, etc., a frequency domain resource length, etc.; the transmission resource of the control channel includes a time domain resource location on which the control channel is located, a time domain resource length, a frequency domain resource location, a frequency domain resource length, etc.

For the above mode 1), the transmission resource of the first reference signal is explicitly indicated through a control channel. For the above mode 2), the transmission resource of the first reference signal is implicitly indicated by a control channel. In this way, the first terminal may calculate the transmission resource of the first reference signal according to the transmission resource of the control channel of the second terminal.

In an implementation, the control channel of the second terminal includes third indication information, wherein the third indication information is used for determining whether the first reference signal is used for the first terminal to perform selection of a target channel or for the second terminal to perform selection of a target channel.

For example, the third indication information is represented by 1 bit, wherein when the bit is 1, it is represented that the first reference signal is used for the first terminal to perform the selection of the target channel, and when the bit is 0, it is represented that the first reference signal is used for the second terminal to perform the selection of the target channel.

In an implementation, the control channel of the second terminal includes fourth indication information, wherein the fourth indication information is used for determining a value of the N. For example, the value of the N is represented by K bits, wherein the K is a positive integer, such as 1, 2, 3, 4.

The first terminal acquires fourth indication information from the control channel of the second terminal, and after determining the value of the N based on the fourth indication information, it may select a corresponding number (i.e., N) of channels (or beams) to respectively perform reception of the N first reference signals in the time domain.

In an implementation, the value of the N is configured by a network or pre-configured. The second terminal determines the value of the N according to a network configuration or a pre-configuration, sends the N first reference signals, and indicates the value of the N through a control channel. The first terminal determines the value of the N by detecting the control channel of the second terminal, and performs reception of the N first reference signals of the second terminal utilizing N channels (or beams).

In an implementation, the first reference signal is configured by a network or pre-configured. For example, a format of the first reference signal, and a sequence (i.e., content) of the first reference signal are configured by a network or pre-configured.

In act 302, the first terminal selects a target channel from the N channels, based on the first reference signal received on the N channels.

In the embodiment of the present disclosure, the first terminal measures signal quality of the first reference signal on the N channels, and selects the target channel from the N channels based on the signal quality corresponding to the N channels.

Here, the signal quality of the first reference signal includes a Reference Signal Received Power (RSRP), a Received Signal Strength Indicator (RSSI), a Signal to Interference Noise Ratio (SINR), etc.

In the embodiment of the present disclosure, the first terminal selects a channel with the best channel quality from the N channels as the target channel.

In act 303, the first terminal transmits data or signaling to the second terminal on the target channel.

In the embodiment of the present disclosure, the first terminal acquires a target transmission resource for transmitting data or signaling by following modes.

1) Based on mode 4: the first terminal acquires the target transmission resource by sensing; or, 2) based on Mode 3: the first terminal receives resource configuration information sent by a network, wherein the resource configuration information includes the target transmission resources used by the first terminal to transmit the data.

In the embodiment of the present disclosure, the first terminal transmits the data or the signaling to the second terminal using the target channel on the target transmission resource. For example, the PSCCH or a Physical Side link Share Channel (PSSCH) of the first terminal is transmitted through the target channel. For the second terminal, the data or the signaling sent by the first terminal is received in an omnidirectional manner.

Figure 4:
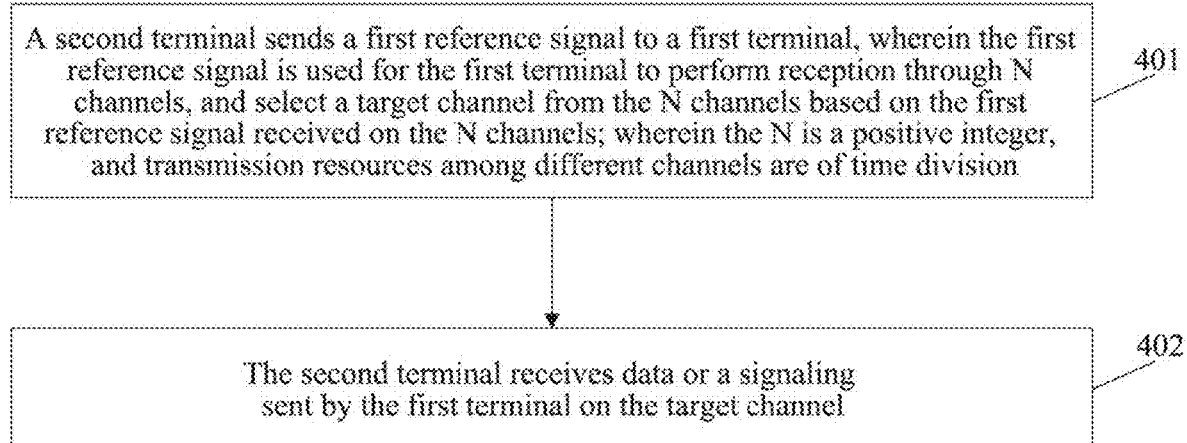
FIG. 4 is Flowchart two of a method for transmitting data according to an embodiment of the present disclosure.

FIG. 4 is Flowchart two of a method for transmitting data according to an embodiment of the present disclosure. As shown in FIG. 4, the method for transmitting data includes following acts.

In act 401, a second terminal sends a first reference signal to a first terminal, wherein the first reference signal is used for the first terminal to perform reception through N channels, and select a target channel from the N channels based on the first reference signal received on the N channels; wherein the N is a positive integer, and transmission resources among different channels are time division.

In the embodiment of the present disclosure, types of the first terminal and the second terminal are not limited and may be devices such as a Vehicle User Equipment, a mobile phone, a notebook computer.

In the embodiment of the present disclosure, the second terminal sends the first reference signal by adopting an omnidirectional manner, and the first terminal receives, through N channels, the first reference signal sent by the second terminal, wherein transmission resources among different channels are time division.

Here, the first terminal receives, through the N channels, the first reference signal sent by the second terminal, which is implemented by a following mode: the first terminal forms N beams by adopting a Beamforming technology, wherein transmission resources among different beams are time division, and one beam represents one channel, and the first terminal adopts a mode of beam polling to receive, through N beams (i.e., channels) respectively, N first reference signals sent by the second terminal, here, the N first reference signals are time division, and the transmission resources may be time-frequency resources.

For example, the second terminal sends N first reference signals, wherein each reference signal occupies one OFDM symbol, and the first terminal respectively receives the N first reference signals using the N beams, that is, the first terminal respectively receives the first reference signals using the N beams on the N symbols on which the first reference signals are located.

In an implementation, the second terminal sends a control channel to the first terminal, wherein a resource of the control channel of the second terminal and a resource of the first reference signal of the second terminal are time division.

For example, the second terminal sends a PSCCH on a subframe n and sends the first reference signal on a subframe n+m, wherein the m is an integer greater than 0. Or, the second terminal sends a PSCCH on symbols p to p+P−1, wherein the P represents a total quantity of symbols occupied by the PSCCH, and starts sending the first reference signal on a symbol p+P−1+q, wherein q is an integer greater than 0. If the second terminal sends N first reference signals, then the second terminal sends a first of the first reference signals on a symbol p+P−1+q, and a quantity of symbols between two adjacent first reference signals may be predefined or configured by a network.

In the embodiment of the present disclosure, the control channel of the second terminal may carry one or more kinds of indication information for assisting the first terminal in receiving the first reference signal.

In an implementation, the control channel of the second terminal includes first indication information, wherein the first indication information is used for determining that a data channel associated to the control channel of the second terminal includes the first reference signal.

In an implementation, the transmission resource of the first reference signal of the second terminal is determined by the control channel of the second terminal, specifically as follows.

1) Explicit indication mode: the control channel of the second terminal includes second indication information, wherein the second indication information is used for determining the transmission resource of the first reference signal.

For example, control information of the second terminal includes indication information, wherein the indication information is used for indicating a time-frequency resource of the first reference signal. If the second terminal sends N first reference signals, the indication information indicates the time-frequency resource of the first reference signal, and a quantity of symbols between two adjacent first reference signals may be predefined or configured by a network.

2) Implicit indication mode: the transmission resource of the first reference signal of the second terminal is determined by a transmission resource of the control channel of the second terminal.

For example, a time resource of the first reference signal and a time resource of the control channel differ by S symbols, wherein the S is a positive integer, and the S is predefined or configured by a network.

In an implementation, the control channel of the second terminal includes third indication information, wherein the third indication information is used for determining whether the first reference signal is used for the first terminal to perform selection of a target channel or for the second terminal to perform selection of a target channel.

In an implementation, the second terminal sends N first reference signals to the first terminal, wherein the first terminal respectively receives the N first reference signals through the N channels, wherein the N first reference signals are time division.

In an implementation, the control channel of the second terminal includes fourth indication information, wherein the fourth indication information is used for determining a value of the N. In this way, the first terminal acquires fourth indication information from the control channel of the second terminal, and after determining the value of the N based on the fourth indication information, it may select a corresponding number (i.e., N) of channels (or beams) to respectively perform reception of the N first reference signals in the time domain.

In an implementation, the value of the N is configured by a network or pre-configured. The second terminal determines the value of the N according to a network configuration or a pre-configuration, sends the N first reference signals, and indicates the value of the N through a control channel. The first terminal determines the value of the N by detecting the control channel of the second terminal, and performs reception of the N first reference signals of the second terminal using N channels (or beams).

In an implementation, the first reference signal is configured by a network or pre-configured. For example, a format of the first reference signal, and a sequence (i.e., content) of the first reference signal are configured by a network or pre-configured.

In act 402, the second terminal receives data or signaling sent by the first terminal on the target channel.

In the embodiment of the present disclosure, the first terminal measures signal quality (such as an RSRP, an RSSI, an SINR) of the first reference signal on the N channels, and selects the target channel from the N channels based on the signal quality corresponding to the N channels. The first terminal transmits the data or the signaling to the second terminal using the target channel on the target transmission resource. For example, the PSCCH or the PSSCH of the first terminal is transmitted through the target channel. For the second terminal, the data or the signaling sent by the first terminal on the target channel is received in an omnidirectional manner.

Figure 5:
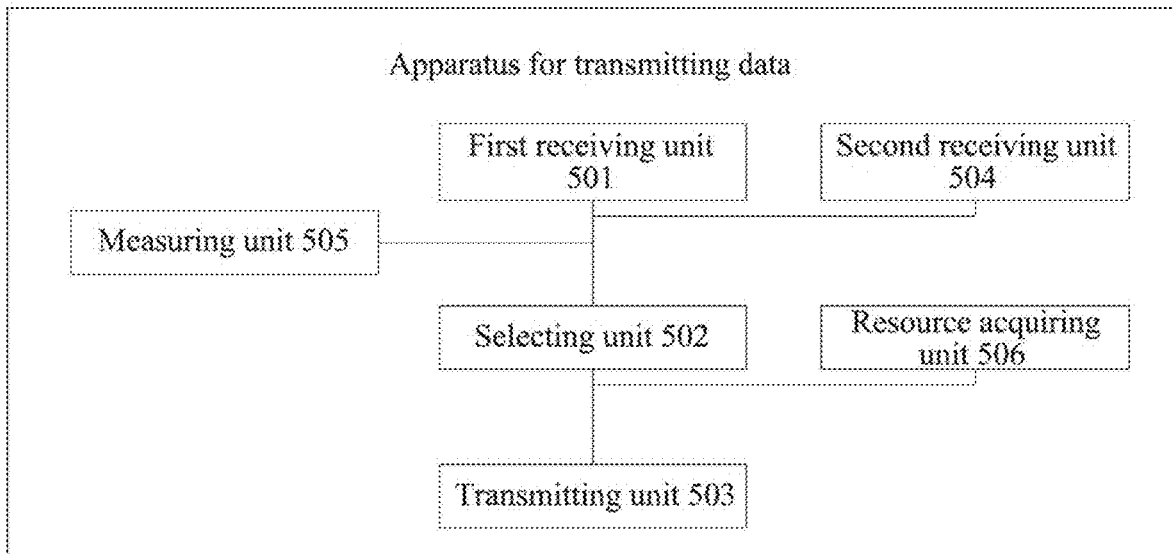
FIG. 5 is Schematic Diagram one of the structural composition of an apparatus for transmitting data according to an embodiment of the present disclosure.

FIG. 5 is Schematic Diagram one of the structural composition of an apparatus for transmitting data according to an embodiment of the present disclosure. As shown in FIG. 5, the apparatus for transmitting data includes: a first receiving unit 501, configured to receive a first reference signal sent by a second terminal through N channels, wherein the N is a positive integer, wherein transmission resources among different channels are time division; a selecting unit 502, configured to select a target channel from the N channels based on the first reference signal received on the N channels; and a transmitting unit 503, configured to transmit data or signaling to the second terminal on the target channel.

In an implementation, the apparatus further includes: a second receiving unit 504, configured to receive a control channel sent by the second terminal, wherein a resource of the control channel of the second terminal and a resource of the first reference signal of the second terminal are time division.

In an implementation, the control channel of the second terminal includes first indication information, wherein the first indication information is used for determining that a data channel associated to the control channel of the second terminal includes the first reference signal.

In an implementation, the transmission resource of the first reference signal of the second terminal is determined by the control channel of the second terminal.

In an implementation, the transmission resource of the first reference signal of the second terminal is determined by the control channel of the second terminal, including: the control channel of the second terminal includes second indication information, wherein the second indication information is used for determining the transmission resource of the first reference signal.

In an implementation, the transmission resource of the first reference signal of the second terminal is determined by the control channel of the second terminal, including: the transmission resource of the first reference signal of the second terminal is determined by a transmission resource of the control channel of the second terminal.

In an implementation, the control channel of the second terminal includes third indication information, wherein the third indication information is used for determining whether the first reference signal is used for the first terminal to perform selection of a target channel or for the second terminal to perform selection of a target channel.

In an implementation, the first receiving unit 501 is configured to respectively receive, through the N channels, N first reference signals sent by the second terminal, wherein the N first reference signals are time division.

In an implementation, the control channel of the second terminal includes fourth indication information, wherein the fourth indication information is used for determining a value of the N.

In an implementation, the value of the N is configured by a network or pre-configured.

In an implementation, the first reference signal is configured by a network or pre-configured.

In an implementation, the apparatus further includes: a measuring unit 505, configured to measure signal quality of the first reference signal on the N channels; the selecting unit 502 is configured to select a target channel from the N channels based on the signal quality corresponding to the N channels.

In an implementation, the apparatus further includes: a resource acquiring unit 506, configured to acquire a target transmission resource by sensing, or receive resource configuration information sent by a network, wherein the resource configuration information includes a target transmission resource used by the first terminal to transmit data; and the transmitting unit 503 is configured to transmit data or signaling to the second terminal using the target channel on the target transmission resource.

Those skilled in the art should understand that the implementation functions of the various units in the apparatus for transmitting data shown in FIG. 5 may be understood with reference to the relevant description of the aforementioned method for transmitting data. The functions of the various units in the apparatus for transmitting data shown in FIG. 5 may be implemented by a program running on a processor or by a specific logic circuit.

Figure 6:
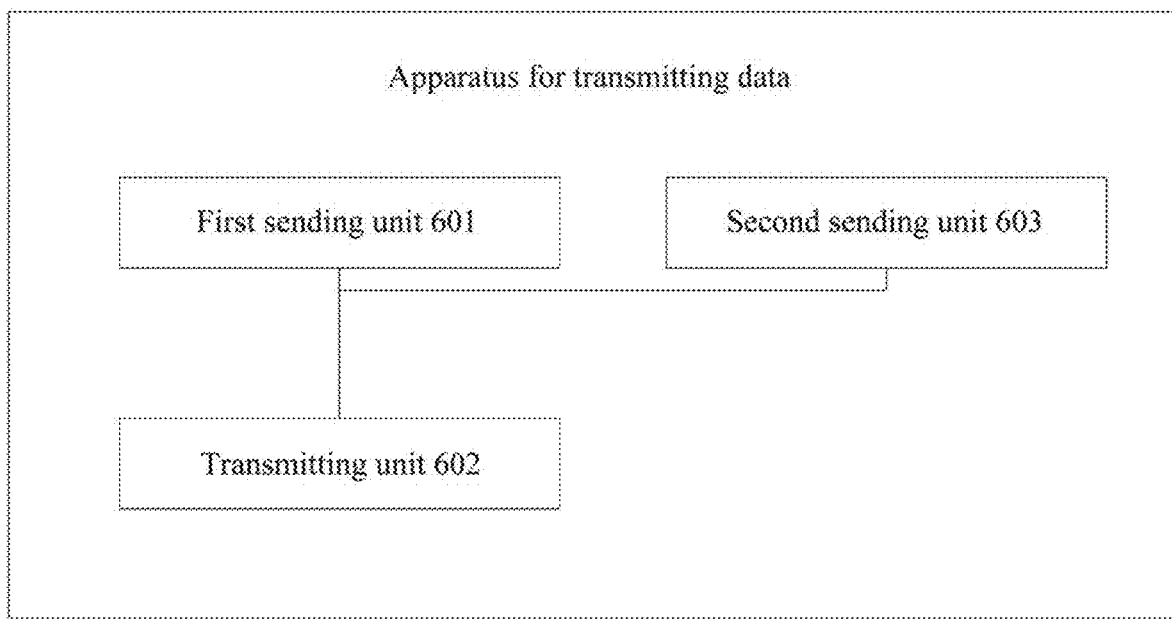
FIG. 6 is Schematic Diagram two of the structural composition of an apparatus for transmitting data according to an embodiment of the present disclosure.

FIG. 6 is Schematic Diagram two of the structural composition of an apparatus for transmitting data according to an embodiment of the present disclosure. As shown in FIG. 6, the apparatus for transmitting data includes: a first sending unit 601, configured to send a first reference signal to a first terminal, wherein the first reference signal is used for the first terminal to perform reception through N channels, and select a target channel from the N channels based on a first reference signal received on the N channels; wherein the N is a positive integer, and transmission resources among different channels are time division; and a transmitting unit 602, configured to receive data or signaling sent by the first terminal on the target channel.

In an implementation, the apparatus further includes: a second sending unit 603, configured to send a control channel to the first terminal, wherein a resource of a control channel of the second terminal and a resource of the first reference signal of the second terminal are time division.

In an implementation, the control channel of the second terminal includes first indication information, wherein the first indication information is used for determining that a data channel associated to the control channel of the second terminal includes the first reference signal.

In an implementation, the transmission resource of the first reference signal of the second terminal is determined by the control channel of the second terminal.

In an implementation, the transmission resource of the first reference signal of the second terminal is determined by the control channel of the second terminal, including: the control channel of the second terminal includes second indication information, wherein the second indication information is used for determining the transmission resource of the first reference signal.

In an implementation, the transmission resource of the first reference signal of the second terminal is determined by the control channel of the second terminal, including: the transmission resource of the first reference signal of the second terminal is determined by a transmission resource of the control channel of the second terminal.

In an implementation, the control channel of the second terminal includes third indication information, wherein the third indication information is used for determining whether the first reference signal is used for the first terminal to perform selection of a target channel or for the second terminal to perform selection of a target channel.

In an implementation, the first sending unit 601 is configured to send N first reference signals to the first terminal, wherein the first terminal respectively receives the N first reference signals through the N channels, wherein the N first reference signals are time division.

In an implementation, the control channel of the second terminal includes fourth indication information, wherein the fourth indication information is used for determining a value of the N.

In an implementation, the value of the N is configured by a network or pre-configured.

In an implementation, the first reference signal is configured by a network or pre-configured.

Those skilled in the art should understand that the implementation functions of the various units in the apparatus for transmitting data shown in FIG. 6 may be understood with reference to the relevant description of the aforementioned method for transmitting data. The functions of the various units in the apparatus for transmitting data shown in FIG. 6 may be implemented by a program running on a processor or by a specific logic circuit.

The above apparatus for transmitting data in the embodiments of the present disclosure may also be stored in a computer readable storage medium when it is implemented in the form of a software function module and sold or used as an independent product. Based on this understanding, the technical solutions in the embodiments of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various embodiments of the present disclosure. The aforementioned storage medium includes a U disk, a mobile hard disk, a Read Only Memory (ROM), a magnetic disk or an optical disk, and another media capable of storing program codes. Thus, the embodiments of the present disclosure are not limited to any specific combination of hardware and software.

Correspondingly, an embodiment of the present disclosure also provides a computer storage medium in which computer-executable instructions are stored, wherein the computer-executable instructions implement, when executed by a processor, the above method for transmitting data according to an embodiment of the present disclosure.

Figure 7:
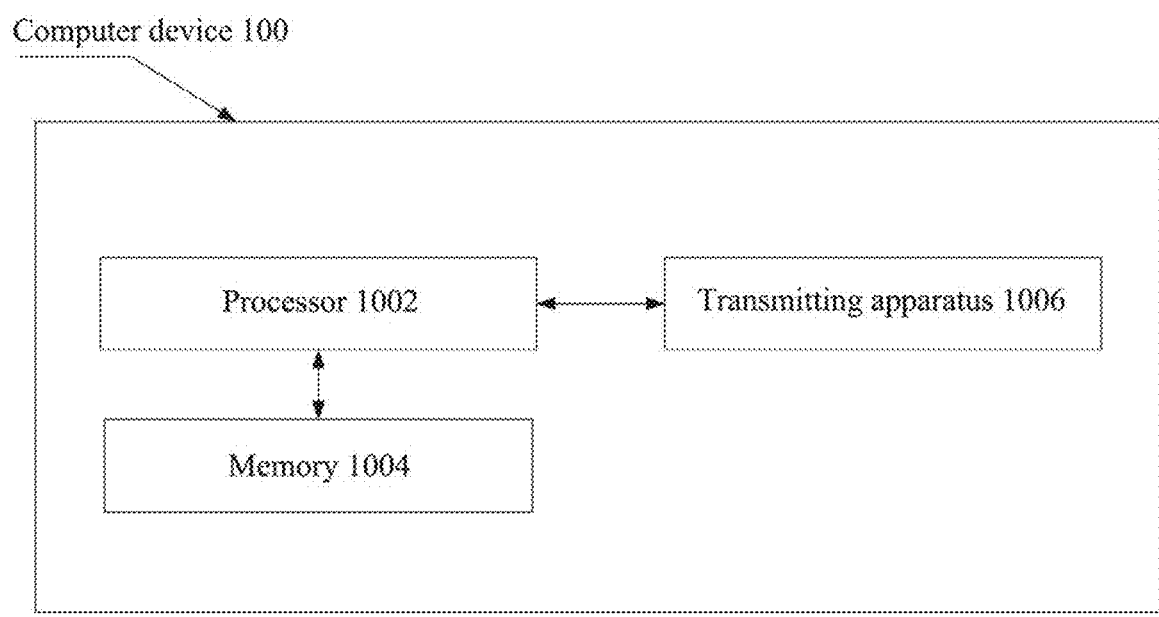
FIG. 7 is a schematic diagram of the structural composition of a computer device according to an embodiment of the present disclosure.

FIG. 7 is a schematic diagram of the structural composition of a computer device according to an embodiment of the present disclosure. The computer device may be any type of terminal. As shown in FIG. 7, a computer device 100 may include one or more (only one is shown in the figure) processors 1002 (the processor 1002 may include, but is not limited to, a processing apparatus such as a Micro Controller Unit (MCU), a Field Programmable Gate Array (FPGA)), a memory 1004 for storing data, and a transmitting apparatus 1006 for communication functions. One of ordinary skill in the art may understand that the structure shown in FIG. 7 is only schematic and does not limit the structure of the above electronic apparatus. For example, the computer device 100 may also include more or fewer components than those shown in FIG. 7, or have a different configuration than that shown in FIG. 7.

The memory 1004 may be configured to store software programs and modules of application software, such as program instructions/modules corresponding to the method in the embodiment of the present disclosure. The processor 1002 executes various functional applications and data processing, i.e., implements the above method, by running the software programs and the modules stored in the memory 1004. The memory 1004 may include a high-speed random access memory and may also include a non-transitory memory such as one or more magnetic storage apparatuses, a flash memory, or another non-transitory solid-state memory. In some examples, the memory 1004 may further include memories remotely disposed with respect to the processor 1002, wherein these remote memories may be connected to the computer device 100 through a network. Examples of the above network include, but are not limited to, the Internet, an intranet, a local area network, a mobile communication network, and combinations thereof.

The transmitting apparatus 1006 is configured to receive or send data via one network. Specific examples of the above network may include a wireless network provided by a communication provider of the computer device 100. In one example, the transmitting apparatus 1006 includes one Network Interface Controller (NIC), which may be connected to another network device through a base station so that the transmitting apparatus 1006 may communicate with the Internet. In one example, the transmitting apparatus 1006 may be a Radio Frequency (RF) module, which is configured to communicate with the Internet through a wireless mode.

The technical solutions described in the embodiments of the present disclosure may be combined arbitrarily with each other, without conflict.

In several embodiments provided by the present disclosure, it should be understood that the disclosed methods and the device may be implemented in another mode. The device embodiment described above is only illustrative, for example, the division of the units is only a logical function division, and there may be other division manners in an actual implementation. For example, multiple units or components may be combined or integrated into another system, or some features may be ignored or not executed. In addition, the mutual coupling or direct coupling or communication connection between various components shown or discussed may be indirect coupling or communication connection through some interface, apparatus or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of the embodiments.

In addition, various functional units in various embodiments of the present disclosure may be all integrated in one second processing unit, or various units may be separately taken as one unit, or two or more units may be integrated in one unit. The above integrated units may be implemented in a form of hardware or in a form of hardware plus software functional units. What are described above are merely example embodiments of the present disclosure, but the protection scope of the present disclosure is not limited thereto. Any person skilled in the art may easily conceive variations or substitutions within the technical scope disclosed by the present disclosure, which should be included within the protection scope of the present disclosure.

What is claimed is:

1. A method for transmitting data, comprising:
receiving, by a first terminal through N channels, a first reference signal sent by a second terminal, where the N is a positive integer, wherein transmission resources among different channels are time division;
selecting, by the first terminal based on the first reference signal received on the N channels, a target channel from the N channels; and
transmitting, by the first terminal, data or signaling to the second terminal on the target channel.

2. The method according to claim 1, wherein the method further comprises:
receiving, by the first terminal, a control channel sent by the second terminal, wherein a resource of the control channel of the second terminal and a resource of the first reference signal of the second terminal are time division.

3. The method according to claim 1, wherein a control channel of the second terminal comprises first indication information, wherein the first indication information is used for determining that a data channel associated to the control channel of the second terminal comprises the first reference signal.

4. The method according to claim 1, wherein a transmission resource of the first reference signal of the second terminal is determined by a control channel of the second terminal.

5. The method according to claim 4, wherein the transmission resource of the first reference signal of the second terminal is determined by the control channel of the second terminal, comprising:
the transmission resource of the first reference signal of the second terminal is determined by a transmission resource of the control channel of the second terminal.

6. The method according to claim 1, wherein a control channel of the second terminal comprises third indication information, wherein the third indication information is used for determining whether the first reference signal is used for the first terminal to perform selection of a target channel or for the second terminal to perform selection of a target channel.

7. The method according to claim 1, wherein a control channel of the second terminal comprises fourth indication information, wherein the fourth indication information is used for determining a value of the N.

8. The method according to claim 1, wherein a value of the N is configured by a network or pre-configured.

9. The method according to claim 1, wherein selecting, by the first terminal based on the first reference signal received on the N channels, the target channel from the N channels, comprises:
measuring, by the first terminal, signal quality of the first reference signal on the N channels, and selecting the target channel from the N channels based on the signal quality corresponding to the N channels.

10. An apparatus for transmitting data, comprising:
a first receiving circuit, configured to receive, through N channels, a first reference signal sent by a second terminal, where the N is a positive integer, wherein transmission resources among different channels are time division;
a selecting circuit, configured to select a target channel from the N channels based on the first reference signal received on the N channels; and
a transmitting circuit, configured to transmit data or signaling to the second terminal on the target channel.

11. The apparatus according to claim 10, wherein the apparatus further comprises:
a second receiving circuit, configured to receive a control channel sent by the second terminal, wherein a resource of the control channel of the second terminal and a resource of the first reference signal of the second terminal are time division.

12. The apparatus according to claim 10, wherein a control channel of the second terminal comprises first indication information, wherein the first indication information is used for determining that a data channel associated to the control channel of the second terminal comprises the first reference signal.

13. The apparatus according to claim 10, wherein a transmission resource of the first reference signal of the second terminal is determined by a control channel of the second terminal.

14. The apparatus according to claim 13, wherein the transmission resource of the first reference signal of the second terminal is determined by the control channel of the second terminal, comprising:
the transmission resource of the first reference signal of the second terminal is determined by a transmission resource of the control channel of the second terminal.

15. The apparatus according to claim 10, wherein a control channel of the second terminal comprises third indication information, wherein the third indication information is used for determining whether the first reference signal is used for the apparatus to perform selection of a target channel or for the second terminal to perform selection of a target channel.

16. The apparatus according to claim 10, wherein a control channel of the second terminal comprises fourth indication information, wherein the fourth indication information is used for determining a value of the N.

17. The apparatus according to claim 10, wherein a value of the N is configured by a network or pre-configured.

18. The apparatus according to claim 10, wherein the apparatus further comprises:
a measuring circuit, configured to measure signal quality of the first reference signal on the N channels;
wherein the selecting circuit is configured to select the target channel from the N channels based on the signal quality corresponding to the N channels.

19. A non-transitory computer storage medium, which has computer-executable instructions stored thereon, wherein the computer-executable instructions implement, when executed by a processor, acts of the method according to claim 1.

20. The non-transitory computer storage medium of claim 19, wherein the method further comprises:
receiving, by the first terminal, a control channel sent by the second terminal, wherein a resource of the control channel of the second terminal and a resource of the first reference signal of the second terminal are time division.

* * * * *